US010082249B2

(12) United States Patent
Albertao et al.

(10) Patent No.: US 10,082,249 B2
(45) Date of Patent: Sep. 25, 2018

(54) DETERMINING FLUID LEAKAGE VOLUME IN PIPELINES

(71) Applicant: International Business Machines Corporation, Armonk, NY (US)

(72) Inventors: Felipe Albertao, Shenyang (CN); Ying Chen, Beijing (CN); Jin Huang, Shanghai (CN); Chunhua Tian, Beijing (CN); Hao Wang, Beijing (CN); Jing Xiao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/727,265

(22) Filed: Oct. 6, 2017

(65) Prior Publication Data
US 2018/0087721 A1 Mar. 29, 2018

Related U.S. Application Data

(63) Continuation of application No. 15/373,821, filed on Dec. 9, 2016, now Pat. No. 9,897,261, which is a
(Continued)

(30) Foreign Application Priority Data

Jun. 27, 2011 (CN) .......................... 2011 1 0175076

(51) Int. Cl.
*F17D 5/06* (2006.01)
*G01F 1/34* (2006.01)
(Continued)

(52) U.S. Cl.
CPC ................ *F17D 5/06* (2013.01); *G01F 1/34* (2013.01); *G01F 22/02* (2013.01); *G01M 3/2815* (2013.01)

(58) Field of Classification Search
CPC .......... G01F 1/34; F17D 5/02; G01M 3/2815; G01M 3/2807; G01M 3/28; G01M 3/26; G01M 3/3263
See application file for complete search history.

(56) References Cited

U.S. PATENT DOCUMENTS 3,851,521 A 12/1974 Ottenstein
5,428,989 A 7/1995 Jerde et al.
(Continued)

FOREIGN PATENT DOCUMENTS

CN 1322914 A 11/2001
CN 1101914 C 2/2003
(Continued)

OTHER PUBLICATIONS

Office Action dated May 4, 2016 for DE Application 112012001851.6, 2 pages.
(Continued)

*Primary Examiner* — Manuel L Barbee
(74) *Attorney, Agent, or Firm* — Jay Wahlquist

(57) ABSTRACT

A method and an apparatus for determining leakage volume of fluid in transportation pipelines are provided. The method comprises: obtaining the negative pressure wave signals detected by at least two pressure sensors arranged on the pipeline; determining the pressure signal at the leakage location based on the negative pressure wave signals; determining the leakage rate during a leakage period based on the pressure signal at the leakage location according to a leakage model; and determining the leakage volume of the fluid in the pipeline based on the leakage rate and the leakage period. The apparatus provided corresponds to the method described above. By using the method and apparatus described above, the leakage volume of the transportation
(Continued)

pipelines can be obtained to help understand the leakage profile of the pipelines and thus reduce losses (FIG. 1).

2 Claims, 9 Drawing Sheets

Related U.S. Application Data continuation of application No. 14/128,640, filed as application No. PCT/CN2012/073381 on Mar. 31, 2012, now Pat. No. 9,759,589.

(51) Int. Cl.
*G01F 22/02* (2006.01)
*G01M 3/28* (2006.01)

(56) References Cited

U.S. PATENT DOCUMENTS

| | | |
|---|---|---|
| 5,708,195 A | 1/1998 | Kurisu et al. |
| 6,116,082 A | 9/2000 | Pride |
| 6,351,985 B1 | 3/2002 | Bedwell |
| 6,446,491 B1 | 9/2002 | Pompa et al. |
| 6,442,999 B1 | 12/2002 | Baumoel |
| 6,668,619 B2 | 12/2003 | Yang et al. |
| 6,912,472 B2 | 6/2005 | Mizushina et al. |
| 7,891,246 B2 | 2/2011 | Lander |
| 9,759,589 B2 | 9/2017 | Albertao et al. |
| 2009/0066524 A1 | 3/2009 | Oishi et al. |
| 2009/0322544 A1 | 12/2009 | McDowell |
| 2010/0139372 A1 | 6/2010 | Samuelson |
| 2011/0295527 A1 | 12/2011 | Ryan |
| 2014/0229124 A1 | 8/2014 | Albertao et al. |
| 2017/0089518 A1 | 3/2017 | Albertao et al. |

FOREIGN PATENT DOCUMENTS

| | | |
|---|---|---|
| CN | 2542909 Y | 4/2003 |
| CN | 101122367 A | 2/2008 |
| CN | 100456010 C | 1/2009 |
| CN | 100567794 C | 12/2009 |
| JP | 53138785 A | 12/1978 |
| JP | 56160499 A | 12/1981 |
| JP | 61165099 A | 7/1986 |
| JP | 02248834 A | 10/1990 |
| JP | 2001337002 A | 12/2001 |

OTHER PUBLICATIONS

Geiger, "State-of-the-Art in Leak Detection and Localisation", Pipeline Technology 2006 Conference, 25 pages.
Horlacher, et al., "Lieferschein", Subito Dokumente aus Bibliotheken e.V., Apr. 18, 2016. 9 pages.
Tetzner, "Model-based Pipeline Leak Detection and Localization", 3R International (42) Helt Jul. 2003. 6 pages.
International Search Report and Written Opinion (PCT) dated Jul. 12, 2012 for International Application PCT/CN2012/073381, 11 pages.
Office Action dated Jul. 29, 2014 for GB Application 1319405.5, 2 pages.
Notification of Grant: Patent Serial No. GB2503635, dated Oct. 21, 2014, 2 pages.
Research and Application on smallest detectable leakage flow rate of long-distance transport pipesnagative pressure wave method>, Dec. 31, 2009, http://www.doc88.com/p-4475456305379.html. 2 pages.
Liang Wei et al., "State of Research on Negative Wave Techniques Applied to Leak Detection n Liquid Pipelines", Pipeline Techniquie and Equipment, Dec. 2004, No. 6, p. 16-19.
List of IBM Patents or Patent Applications Treated as Related, Oct. 4, 2017, 2 pgs.

| P1/P0 | a |
|---|---|
| [0.10%] | 10% |
| [10%, 30%] | 5% |
| [30%, 75%] | 1.5% |
| 75%, 100% | 1.0% |

| Pi/P1 | b |
|---|---|
| [0.0.75] | Pi/P1 |
| [0.75.1.25] | 1 |
| [1.25] | Min{10,Pi/P1} |

Fig. 8B

DETERMINING FLUID LEAKAGE VOLUME IN PIPELINES

TECHNICAL FIELD

The present invention relates to the field of pipeline transportation in industries, and more particularly, to method and apparatus for determining leakage information in pipelines.

DESCRIPTION OF THE RELATED ART

In modern industries, it is often required to transport various kinds of fluidic raw materials, such as oil, gas, water, etc, over long distances via pipelines. Currently, the total length of the oil and gas pipelines in the world is 3.5*106 km. The long-distance backbone pipeline in China has exceeded 80,000 km, responsible for the transportation of 70% of oil and 99% of natural gas in China.

However, many of these long distance pipelines have become aged because of long service time. For example, in China, the service time of about 60% of the long-distance backbone pipelines is over 20 years, and many pipelines have operated for more than 30 years and have moved into a period when accidents occurred very often.

Besides the corrosion and aging of pipelines, reasons of leakage further include changes of the external geography, climate change, and external vibration. In addition, the more frequent man-made drill for stealing materials is also one of the main reasons for pipeline leakage.

It is obvious that pipeline leakage would cause great loss of raw materials and great economic loss, and it would also cause environmental pollution and danger, thus having great harmfulness. In order to reduce the harmfulness to the minimum level, the engineering technical personnel desire to acquire the information relating to leakage, such as leak location and leak time, in the shortest time after the leakage happens so as to take remedial measures as soon as possible.

For acquiring such leakage information, several solutions have been adopted in the prior art. In one solution, the fluid flow in the pipelines is detected, and the leakage information is determined according to the flow difference at the two ends of a pipe or the flow change at a certain end. However, this solution has low sensitivity and hence low accuracy, not satisfying the need of industrial projects. In another solution, an optical fibre system is arranged outside pipelines, and the leakage information is determined by the detection of changes of the optical fibre signals. Alternatively, a fluid-sensing wire may be arranged, and the leakage information is obtained by the detection of changes of conductivity of the fluid. These two solutions have high accuracy, but require too much project cost, and thus it is difficult to apply on a large-scale basis.

SUMMARY

In view of various factors such as cost and accuracy, one of the practical solutions is to determine the leakage information of pipelines with negative pressure wave.

In particular, during the transportation of fluid, the transported fluid exerts a pressure on the wall of pipes. By arranging a number of pressure sensors along the pipelines, the pressure signals of the fluid may be detected. Generally, the pressure sensors may be arranged at two ends of a pipe segment. If leak occurs at a location on the pipe segment, the fluid will release some pressure because of the leakage at the leaking hole, resulting in a decrease of the pressure on the pipelines. The pressure decrease propagates along the pipelines in the form of waves, and is captured by the pressure sensors arranged at the ends. As such, the pressure sensors will obtain a decrease of the pressure signal caused by the leakage, which is also referred to as negative pressure waves. The negative pressure waves can tell us some information relating to the leakage of pipelines. In the prior art, however, the analysis to the negative pressure waves is not sufficient, and the obtained leakage information is not complete. The obtained information only includes the approximate time and location of the leakage, and does not include further information such as leakage rate or leakage volume. Thus, it needs to be further improved and enhanced.

In view of the questions existed in the prior art, the present invention is proposed to provide a method and an apparatus for determining leakage volume of fluid in pipelines, thereby overcoming at least one disadvantage of the prior art.

According to one aspect, the invention provides a method for determining leakage volume of fluid in transportation pipelines, comprising: obtaining the negative pressure wave signals detected by at least two pressure sensors arranged on the pipelines; determining the pressure signal at the leakage location according to the negative pressure wave signals; determining the leakage rate during a leakage period based on the pressure signal at the leakage location according to a leakage model; and determining the leakage volume of the fluid in the pipelines based on the leakage rate.

According to another aspect, the invention provides an apparatus for determining leakage volume of fluid in transportation pipelines, comprising: a signal-obtaining unit, configured to obtain the negative pressure wave signals detected by at least two pressure sensors arranged on the pipelines; a pressure-determining unit, configured to determine the pressure signal at the leakage location according to the negative pressure wave signals; a rate-determining unit, configured to determine the leakage rate during a leakage period based on the pressure signal at the leakage location according to a leakage model; and a volume-determining unit, configured to determine the leakage volume of the fluid in the pipelines based on the leakage rate.

By using the method and apparatus of the invention, we can effectively obtain the more detailed leakage information of the pipelines, thereby help acquire the leakage profile of the pipelines and reduce costs.

BRIEF DESCRIPTION OF THE DRAWINGS

FIG. 8B exemplarily shows a query table according to an embodiment;

DETAILED DESCRIPTION

Figure 1:
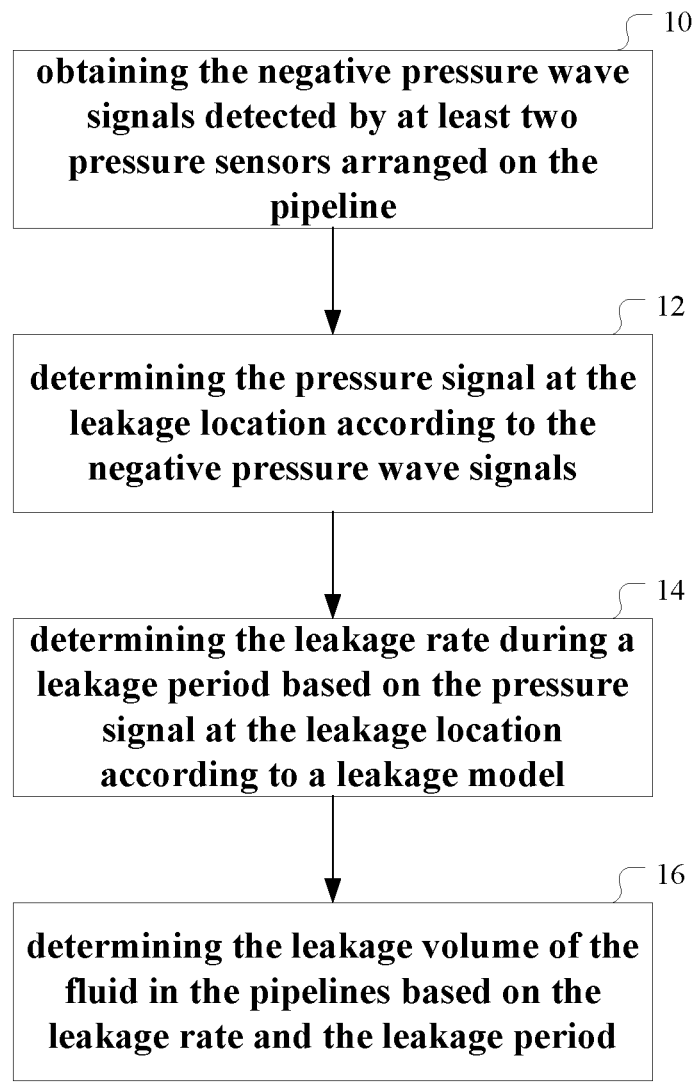
FIG. 1 is a flow chart showing the method for determining leakage volume according to an embodiment of the invention.

As will be appreciated by one skilled in the art, aspects of the present invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium having computer usable program code embodied in the medium.

Any combination of one or more computer readable medium may be utilized. The computer readable medium may be computer-readable signal medium or computer-readable storage medium. The computer-readable storage medium may be, for example but not limited to, an electronic, magnetic, optical, electromagnetic, infrared, or semiconductor system, apparatus, device or any combinations thereof. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any proper combinations thereof. In the context of this document, a computer-readable storage medium may be any tangible medium that can contain, or store the program for use by or in connection with the instruction execution system, apparatus, or device.

Computer readable signal medium may include a propagated data signal with the computer-readable program code embodied therewith, either in baseband or as part of a carrier wave. Such propagated signal may use any proper form, including but not limited to, electromagnetic signal, optical signal, or any proper combination thereof. Computer readable signal medium may be any computer readable medium that is different from computer-readable storage medium and can communicate, propagate, or transport the program for use by or in connection with the instruction execution system, apparatus, or device.

Program code included in the computer readable medium may be transmitted using any appropriate medium, including but not limited to wireless, wireline, optical fiber cable, RF, etc. or any proper combination thereof.

Computer program code for carrying out operations of the present invention may be written in any combination of one or more programming languages, including an object oriented programming language such as Java, Smalltalk, C++ or the like and conventional procedural programming languages, such as "C" programming language or similar programming languages. The program code may execute entirely on a user computer, partly on a user computer, as a stand-alone software package, partly on user computer and partly on a remote computer or entirely on a remote computer or server. In the latter scheme, the remote computer may be connected to the user computer through any type of network, including a local area network (LAN) or a wide area network (WAN), or the connection may be made to an external computer (for example, through the Internet using an Internet Service Provider).

Below, aspects of the invention will be described with reference to flowchart and/or block diagram of methods, apparatuses (systems) and computer program products of the embodiment of the invention. Note that, each block of the flowchart and/or block diagram, and combinations of blocks in the flowchart and/or block diagram, can be implemented by computer program instructions. These computer program instructions may be provided to a processor of a general-purpose computer, a special-purpose computer or other programmable data processing apparatus to produce a machine, such that the instructions which execute on the computer or other programmable data processing apparatus create means for implementing the functions/actions specified in the block(s) of the flowchart and/or block diagram.

These computer program instructions may also be stored in a computer-readable medium that can direct a computer or other programmable data processing apparatus to function in a particular manner, such that the instructions stored in the computer-readable medium produce an article of manufacture including instruction means which implement the functions/actions specified in the block(s) of the flowchart and/or block diagram.

The computer program instructions may also be loaded into a computer or other programmable data processing apparatus to perform a series of operational steps on the computer or other programmable data processing apparatus so as to produce computer implemented process, such that the instructions which execute on the computer or other programmable data processing apparatus will provide process for implementing the functions/actions specified in the block(s) of the flowchart and/or block diagram.

Next, the embodiments of the invention will be described in conjunction with the drawings. It should be appreciated that the description of the following detailed examples are merely to explain the exemplary implementing modes, rather than to impose any limitation on scope of the invention.

In some embodiments of the invention, the negative pressure waves detected by pressure sensors are used to determine the leakage information of pipelines, including leakage location, leakage time, leakage rate, leakage volume, etc. FIG. 1 is a flow chart showing the method for determining fluid leakage volume in pipelines according to an embodiment of the invention. As shown in FIG. 1, the method according to the embodiment comprises: in step 10, obtaining the negative pressure wave signals detected by at least two pressure sensors arranged on the pipelines; in step 12, determining the pressure signal at the leakage location according to the negative pressure wave signals; in step 14, determining the leakage rate during a leakage period based on the pressure signal at the leakage location according to a leakage model; and in step 16, determining the leakage volume of the fluid in the pipelines based on the leakage rate and the leakage period.

Specifically, first of all, in step 10, the negative pressure wave signals detected by pressure sensors are obtained. As described in the DESCRIPTION OF THE RELATED ART section, in order to monitor the pressure of the transported fluid, a plurality of pressure sensors are arranged in advance on the pipelines. In one case, multiple pressure sensors are arranged along the pipelines at regular intervals. In general cases, for each whole segment of a straight pipeline, pressure sensors are arranged at least at both ends of the segment. More particularly, the pressure sensors may be arranged on the valves at the inlet and outlet of the straight pipeline, thereby detecting the pressure of the transported fluid.

To determine the leakage information such as the leakage location, the leakage period, etc, it at least needs the negative pressure wave signals from two pressure sensors. In one embodiment, the two pressure sensors are located at the upstream and downstream of the leakage location, respectively. In one particular example, the two pressure sensors are the ones closest to the leakage location at the upstream and downstream, respectively. It is appreciated, however, that the leakage location would be unknown until it is determined with the help of the negative pressure wave signals. Nevertheless, as the sudden pressure decrease caused by the leakage would propagate along the pipelines, the two sensors closest to the leakage location may be determined according to the order and time when the negative pressure waves appear in the pressure signals detected by various pressure sensors.

It is appreciated that the choice of the pressure sensors as described above is non-limiting. According to the desired calculation accuracy, a person skilled in the art may accordingly choose more sensor signals to improve the calculation accuracy or to verify the calculation results. Alternatively, according to the actual arrangement of sensors, a person skilled in the art may choose two or more sensor signals that are more accessible, rather than the sensor signals closest to the leakage location. The choice of sensors as described above as well as the choice of sensors conducted by a person skilled in the art after reading the disclosure of the specification are encompassed in the scope of the invention.

Figure 2A:
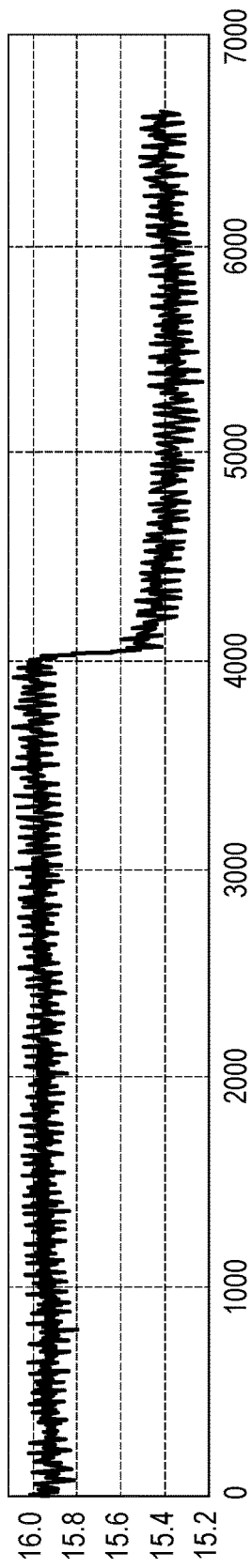
FIG. 2A exemplarily shows negative pressure wave signals from a pressure sensor.

On the basis that at least two pressure sensors are determined as described above, the negative pressure wave signals detected thereby may be obtained. FIG. 2A exemplarily shows negative pressure wave signals from a pressure sensor. As shown in the figure, the pressure signals are maintained at a relatively high level for a period of time, and decrease suddenly at a time point, which means the occurrence of leakage.

Figure 2B:
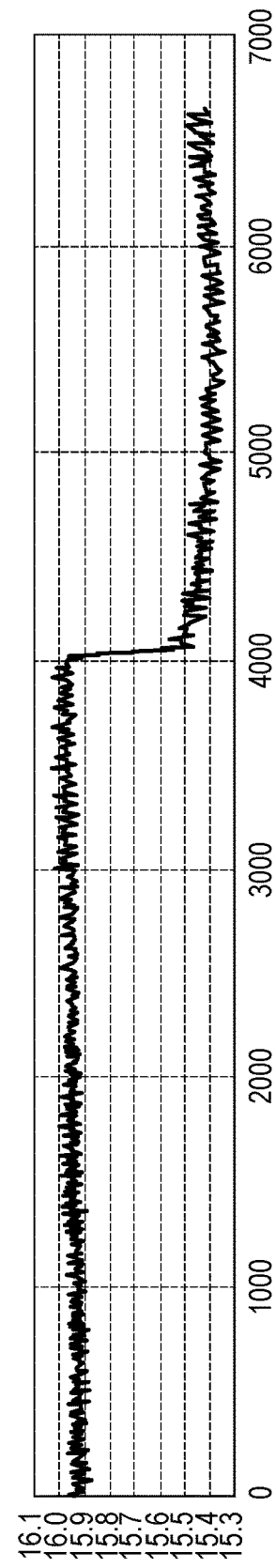
FIG. 2B exemplarily shows the filtered negative pressure wave signals.

In one embodiment, the step of obtaining negative pressure wave signals further comprises filtering the read signals. More particularly, the read negative pressure wave signals may be processed by a low pass filter, and thereby the high frequency noise is removed, thus obtaining much purer signals. FIG. 2B exemplarily shows the filtered negative pressure wave signals. That is to say, the signals shown in FIG. 2A are processed by a low pass filter, thus obtaining the negative pressure wave signals with the high frequency noise removed as shown in FIG. 2B.

Figure 3:
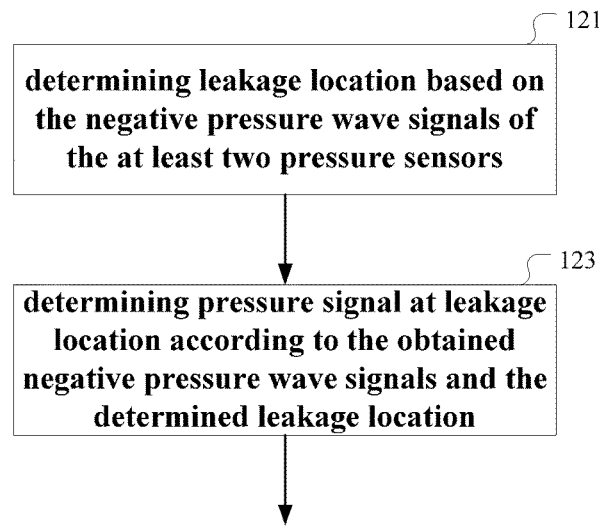
FIG. 3 shows the substeps of step 12 according to an embodiment of the invention.

On the basis of obtaining the negative pressure wave signals from at least two pressure sensors, the method according to the embodiment performs step 12, determining the pressure signal at the leakage location according to the obtained negative pressure wave signals. FIG. 3 shows the substeps of step 12 according to an embodiment of the invention. In particular, as shown in FIG. 3, in order to determine the pressure signal at the leakage location, in step 121, it determines the leakage location based on the negative pressure wave signals of the at least two pressure sensors; and then in step 123, it determines the pressure signal at the leakage location according to the obtained negative pressure wave signals and the determined leakage location. Next, the above steps will be described in conjunction with a typical case as shown in FIG. 4.

Figure 4:
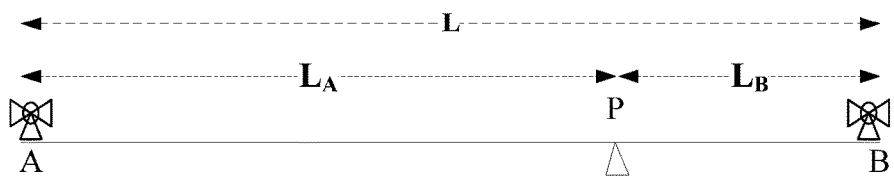
FIG. 4 exemplarily shows a view of the pressure sensors and the leakage location in a typical situation.

FIG. 4 exemplarily shows a view of the pressure sensors and the leakage location in a typical situation. In the scenario of FIG. 4, at both ends of a straight pipeline of length L, the pressure sensors A and B are arranged, respectively, which detect pressure signals expressed by PA (t) and PB (t), respectively. Suppose leak occurs at time point t0 and position P, and distances from P to the pressure sensors A and B are LA and LB, respectively. The pressure change caused by leakage at P propagates towards two opposite directions at speed V, and reaches the two pressure sensors A and B at time points tA and tB, respectively. In addition, suppose the fluid in the pipeline flows from end A to end B at speed v, then the following formula can be obtained:

$$L_A=(t_A-t_0)(V-v)$$
$$L_B=(t_B-t_0)(V+v) \quad (1)$$

The following formula can be obtained by eliminating t0 from the above two formulas:

$$t_A - \frac{L_A}{(V-v)} = t_B - \frac{L_B}{(V+v)} \quad (2)$$

If the relationship $L_A+L_B=L$ is taken into consideration, the following formula can be obtained:

$$L_A = (V-v)\frac{(V+v)(t_A-t_B)+L}{2V} \quad (3)$$
$$L_B = (V+v)\frac{L-(t_A-t_B)(V-v)}{2V}$$

In the above formulas, LA and LB are dependent on variables tA, tB, V and v, wherein tA and tB can be obtained by reading the time points when the pressure decreases suddenly in pressure signals PA (t) and PB (t) of the sensors A and B, V depends on materials of the pipeline and ambient temperature, v depends on properties of the fluid and exerted pressure intensity, and both V and v can be obtained by measuring or analyzing historic data. Hence, distances from leakage position P to sensors A and B, i.e. LA and LB, can be determined by using the above formulas.

Based on the leakage location parameter such determined, in step 123, the pressure signal at leakage position P can be calculated. In particular, it may be supposed that the fluid pressure changes linearly along the pipeline, that is, the pressure difference between two positions is proportional to the distance therebetween, and therefore it may be found that the pressure signal P (t) at leakage position P is:

$$P(t) = \frac{L_A * P_A(t) + L_B * P_B(t)}{L} \quad (4)$$

The pressure signal P (t) at leakage position P can be obtained by putting values of LA and LB in formula (3) into formula (4), and combining the pressure signals PA (t) and PB (t) read from sensors.

In the above embodiment, a process for determining the pressure signal at leakage position according to a particular model is illustrated; it can be appreciated, however, such embodiment is not limiting. A person skilled in the art may modify the above model, or use other models and hypotheses to determine the pressure signal P (t). For example, in the process of determining leakage location, as v<<V is usually true, a person skilled in the art may omit the items associated with v, and therefore estimate the leakage position more easily; alternatively, he may further modify formula (3) by considering other variables associated with the propagation of negative pressure waves. In the process of determining the pressure signal P (t) based on the leakage location, a person skilled in the art may further modify the linear model by considering the distribution of the pressure waves along the pipeline, and therefore calculate the pressure signals more accurately.

On the basis of obtaining the pressure signal P (t) at leakage position, the pressure signal may be further analyzed to determine additional leakage information, as shown in steps 14 and 16 of FIG. 1.

Figure 5:
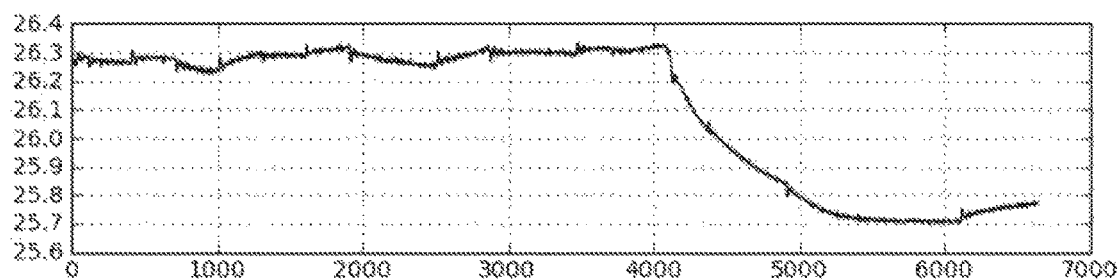
FIG. 5 exemplarily shows pressure signals obtained according to an embodiment.

FIG. 5 exemplarily shows pressure signals obtained according to an embodiment. In one embodiment, the fluid leakage rate and volume under the pressure signal P (t) of FIG. 5 are determined by using a simple proportional leakage model. In particular, in one example, in step 14, according to a proportional leakage model, it can be approximately deemed that the fluid leakage rate I after the leak begins is proportional to the stable pressure intensity P, that is, I=λP, wherein P is the stable pressure intensity before the leak begins, λ is a proportionality factor, which depends on properties of the fluid and can be obtained empirically from historic data. Subsequently, in step 16, the leakage volume may be approximately estimated as the product of the above leakage rate I and the leakage period:

$$M=I(t-t_0)=\lambda P(t-t_0) \quad (5)$$

By the above formula, the estimation of the fluid leakage volume M in pipelines can be obtained.

In another example, the leakage rate and volume are estimated by using a modified proportional model. In particular, in step 14, in the modified proportional model, it can be deemed that the fluid leakage rate i is proportional to the pressure intensity P (t) at each time point, i.e. I=λP(t), wherein λ is also a proportionality factor, but P (t) is the pressure intensity at time point t during the leak process. Therefore, the leakage rate is a variable changing with time, instead of a constant. As such, in step 16, the leakage volume can be estimated as the integral of leakage rate and time:

$$M = \int_{t_0}^{t} \lambda P(t) dt \quad (6)$$

By the above formula, the fluid leakage volume M in pipelines is determined by the modified proportional model.

Figure 6A:
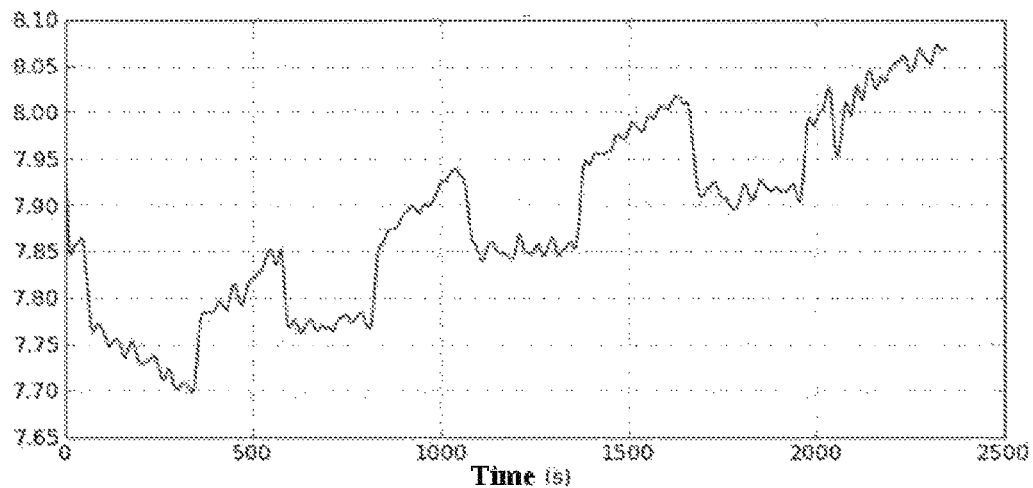
FIG. 6A exemplarily shows pressure signals obtained according to an embodiment.

However, the actual leak process of fluid may be much more complex. During the leak process, the negative pressure waves propagate along the pipeline, reflect at the end of the pipeline, and are superposed with the initial waves, such that the detected negative pressure wave signals, and therefore the pressure signal P (t) at leakage location determined based thereon, fluctuate repeatedly. Furthermore, it usually takes several hours to fix the leakage point after the leak begins. During such a long time period, the pressure signal P (t) may sometimes be unstable due to various external factors, such as geological factors, human factors, etc. On the other hand, in many transportation pipelines, automatic pressure devices are arranged. Once it is found that the fluid pressure is not high enough, an automatic pump will be triggered to pressurize the fluid, thereby ensuring the transportation of the fluid. In this case, if the sudden pressure decrease caused by leakage triggers the above automatic pump, the pressurization of the automatic pump will in turn bring more complex influences and changes to the pressure signal P (t) at leakage location. FIG. 6A exemplarily shows pressure signals obtained according to an embodiment. It can be seen that, as compared with FIG. 5, the pressure signal P (t) shown in FIG. 6A has repeated fluctuation and more complex changes. As such, in steps 14 and 16, more refined leakage models may be used to determine leakage information.

Figure 7:
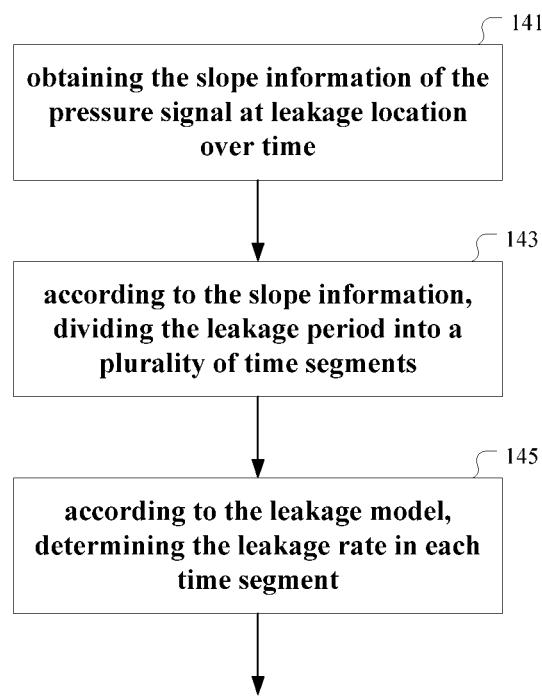
FIG. 7 shows the substeps of step 14 according to an embodiment of the invention.

FIG. 7 shows the substeps of step 14 according to an embodiment of the invention. In the embodiment as shown in FIG. 7, step 14 of determining the leakage rate during a leakage period may be carried out by the following substeps: first in step 141, obtaining the slope information of the pressure signal P (t) at leakage location over time; then in step 143, according to the slope information, dividing the leakage period into a plurality of time segments; and in step 145, according to the leakage model, determining the leakage rate in each time segment.

Figure 6B:
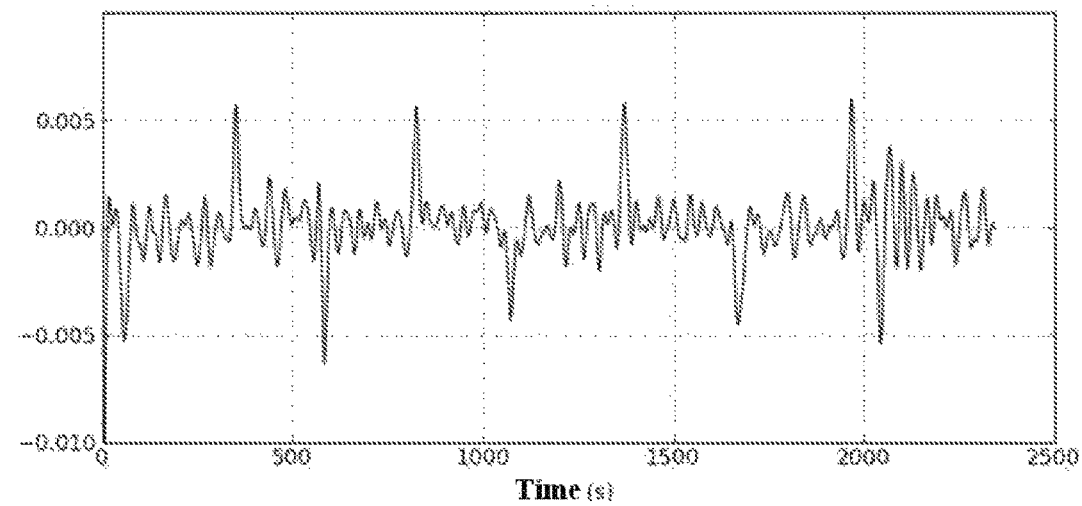
FIG. 6B shows the slope signals corresponding to the pressure signals shown in FIG. 6A.

In particular, for the pressure signal P (t) as shown in FIG. 6A, in step 141, it can calculate the change rate of the pressure signal over time, i.e. the slope information. FIG. 6B shows the slope signals thus obtained corresponding to the pressure signals shown in FIG. 6A.

Based on the obtained slope signals, the characteristic time points when sudden pressure changes occur may be labeled. In one example, in step 143, it compares the slope signals with a predetermined threshold, finds the slope points where the absolute values of the slope are larger than or equal to the predetermined threshold, and determines the time points corresponding to these slope points. Thus determined time points correspond to the characteristic time points when sudden pressure changes occur. By using these characteristic time points, the leakage period can be divided into a plurality of time segments.

Figure 6C:
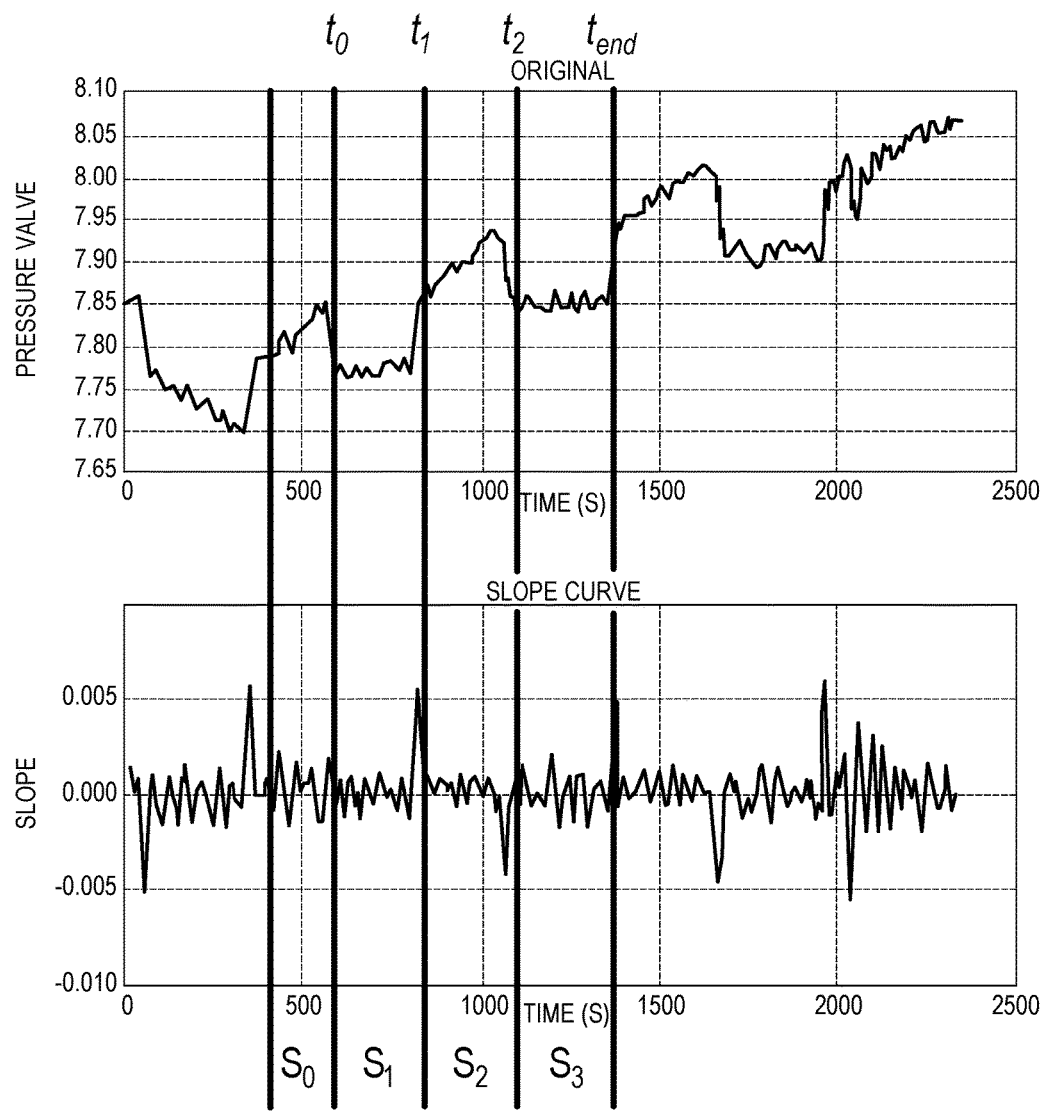
FIG. 6C schematically shows the labeled feature time points and the divided time segments.

FIG. 6C schematically shows the labeled characteristic time points and the divided time segments. In accordance with the method described above, based on the slope information of FIG. 6B, a series of characteristic time points t0, t1, t2 . . . can be determined; accordingly, these time points constitute a plurality of successive time segments S0, S1, S2, S3, wherein Si=[ti−1, ti], S0=[t0−δ, t0], and δ may be a predetermined value. By dividing the leakage period into a plurality of time segments, it can be seen that the pressure is relatively stable within each time segment. Thus, it can more accurately determine the leakage rate and volume within each time segment.

Hence, in step 145, according to the leakage model, the leakage rate of the stable fluid within each time segment is determined. For the stable fluid, there are many leakage models for estimating the leakage rate and volume. The precision and complexity of evaluation would be different for different models. Detailed procedure for estimating leakage rate in several models will next be illustrated exemplarily.

Figure 8A:
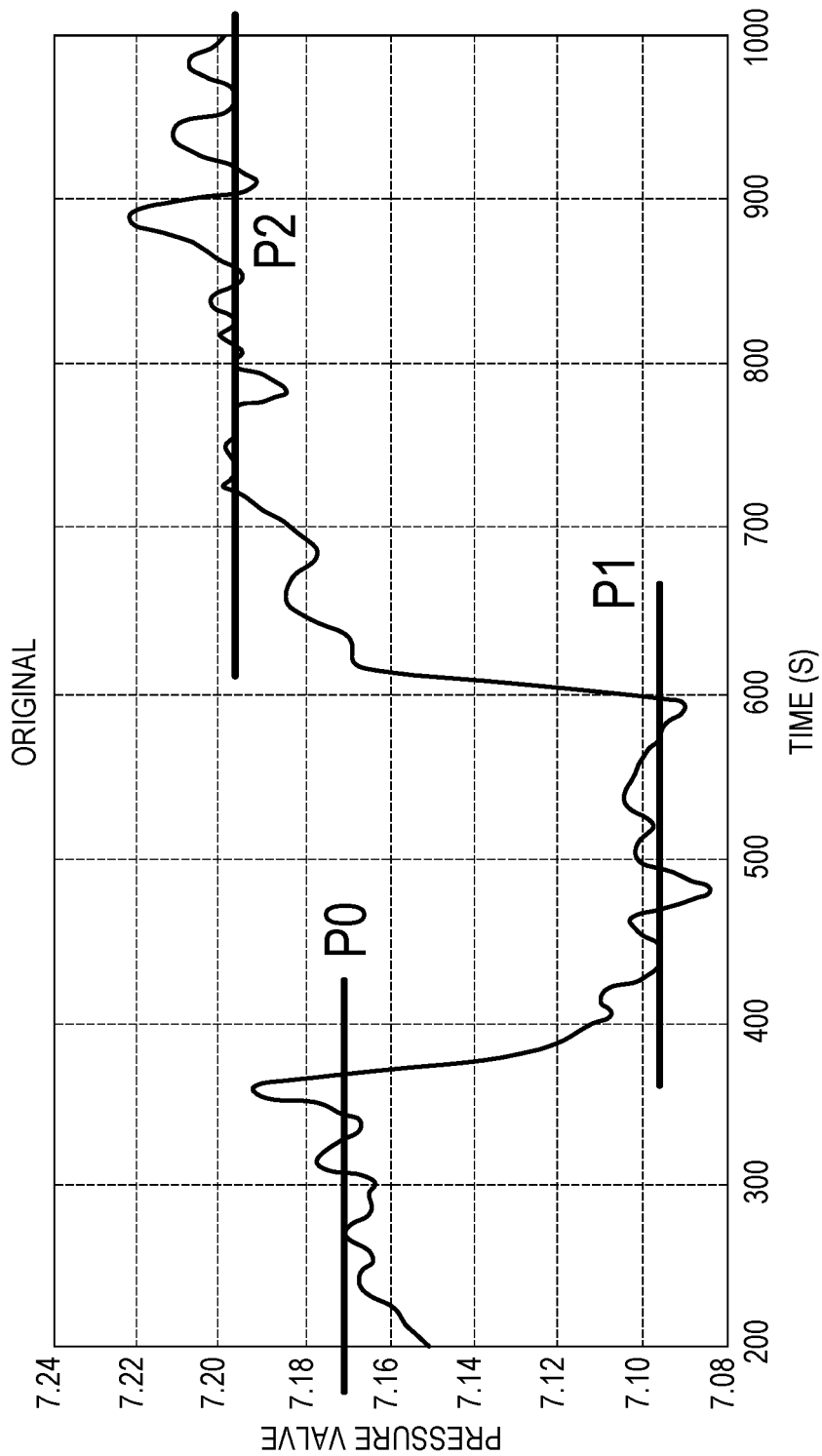
FIG. 8A exemplarily shows the average pressure intensity in several time segments.

In one leakage model, it is considered that the leakage rate is related to the pressure intensity ratio within a time segment. In particular, suppose that P0 is the average pressure intensity before the leak begins, P1 is the average stable pressure intensity within the first time segment after the leak begins, Pi is the average stable pressure intensity within the i'th time segment. Because of the sudden pressure decrease caused by the leakage, P0>P1. However, after the leak begins, due to automatic pressurization or other factors, it is possible that the pressure intensity increases as compared with P1, that is, it is possible that the pressure intensity within the i'th time segment (i>1) is larger than P1. FIG. 8A exemplarily shows the average pressure intensity in several time segments. In the pressure intensity ratio model, it can be considered that the leakage rate in the first time segment is:

$$\text{flow}1 = \max\{P0/P1-1,0\}*\text{flow} \quad (7a)$$

wherein flow is a variable associated with properties of the fluid and can be obtained empirically from historic data. In the subsequent i'th time segment, the leakage rate is considered as:

$$\text{flow}i = \text{flow}1 * Pi/P1 \quad (7b)$$

By the above formulas (7a) and (7b), the leakage rate in each time segment can be determined.

The above model can be modified by further considering additional variables so as to obtain more accurate estimation of the leakage rate. In particular, a fluid function f (T, flow_type) may be introduced, which function is associated with the temperature T and the type of the fluid. On this basis, it can be deemed that the fluid leakage rate in the i'th time segment is:

$$\text{flow}i = f(T,\text{flow\_type})*\max\{P0/P1-1,0\}*(Pi)^\beta \quad (8)$$

wherein, β is determined by historic data. Thus, the leakage rate within each time segment can be obtained.

In another leakage model, a query table is obtained by studying historic data and is used to indicate the fluid leakage pattern under various pressures. When estimating the fluid leakage rate, various parameters associated with the leakage rate can be determined by referring to the query table. FIG. 8B exemplarily shows a query table according to an embodiment. In the embodiment associated with FIG. 8B, the leakage rate in the first time segment is expressed as (9a), and the leakage rate in the subsequent i'th time segment is expressed as (9b):

$$\text{flow}1 = a*\text{flow} \quad (9a)$$

$$\text{flow}i = \text{flow}1 * b \quad (9b)$$

wherein the proportionality factors a and b are determined by the query table shown in FIG. 8B. In particular, in the process of determining the proportionality factor a, the ratio of the stable pressure intensity P1 in the first time segment to the stable pressure intensity P0 before the leak begins is considered, and the value of a is determined based on the range to which the above ratio belongs. In the process of determining proportionality factor b, the ratio interval of the stable pressure intensity Pi in the i'th time segment to the P1 is considered to determine the value of b. Based on the determined proportionality factors a and b, the leakage rate in each time segment can be determined.

In the above, the examples of determining leakage rates in various time segments according to particular leakage models are illustrated in several embodiments; it can be understood, however, that these examples are not limiting. A person skilled in the art may modify the above leakage models, or use other leakage models and hypotheses to determine the leakage rate within a particular time segment.

On the basis of determining the leakage rate in each time segment, the leakage volume during a time period can be determined, that is, step 16 in FIG. 1 is carried out. In particular, if the time period from the leakage starting time t0 to current time t is divided into n time segments, wherein the fluid leakage rate in the i'th time segment Si is determined as flowi, the leaked fluid volume from t0 to the current time is:

$$M = \sum_{i=1}^{n} \text{flow}i * S_i = \sum_{i=1}^{n} \text{flow}i * (t_i - t_{i-1}) \quad (10)$$

In the examples described above, the total leakage volume is obtained by dividing the leakage period into a plurality of time segments, determining the leakage rate in each time segment, and then summating leakage volumes in all time segments.

It can be seen that, in the process of determining the leakage volume, the method according to the embodiments of the invention may additionally determine many pieces of leakage-related information, such as leakage location, leakage time (period), the pressure signal at the leakage location, leakage rate, etc. This information may also be used in other applications for further analyzing the leakage.

In steps 10 to 16 of FIG. 1, many models are used, including, for example, models for selecting pressure sensors, models for determining the pressure signal at the leakage location, leakage models for determining the leakage rate in a particular time segment, and the like. These models may be selected by a person skilled in the art based on their experiences and requirements, and be applied in various embodiments of the invention. Alternatively, in one embodiment, the appropriate models may be selected or provided by users. In particular, in one example, the method according to an embodiment of the invention further comprises the step of providing a model library and the step of receiving model selection, wherein in the step of providing a model library, it integrates various models that may possibly be used into a model library, provides it to users via an appropriate interface, and provides the options of models to users; in the step of receiving model selection, it receives the selection of models made by users via the interface. Hence, the variables associated with the leakage information can be determined based on the models selected by users. In another example, the models may also be provided or defined by users. In this case, the method according to an embodiment of the invention may comprise the step of receiving model definition, for receiving the definition of models made by users. In particular, in this step, a user-interactive interface may be provided, such that users may specify leakage models by inputting the definition of models via the interface, for example, inputting a definitive formula similar to formula (8). Thus, models specified or defined by users may be used to determine the leakage information. It can be understood that the model-determining modes in the examples described above may be combined to provide more flexible implementing modes. That is, according to an embodiment, among various models to be used, some models may be predetermined by the system, some models may be selected from the model library by users, and other models may be directly defined by users. Correspondingly, the embodiment selectively comprises the step of providing a model library, the step of receiving model selection, the step of receiving model definition, etc, as described above.

By using the method according to the embodiments described above, the desired leakage information, including leakage location, leakage rate and leakage volume, may be obtained using several models based on the negative pressure wave signals detected by the pressure sensors on pipelines. These pieces of information help researchers and engineers know the leakage profile quickly, and take appropriate measures in time, thus reducing the cost caused by the leakage to the minimum level.

Figure 9:
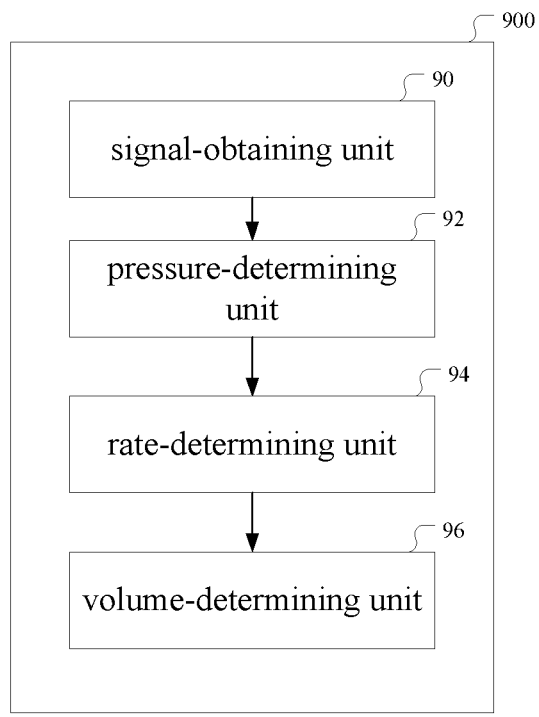
FIG. 9 shows a block diagram of an apparatus according to an embodiment of the invention.

Based on the same inventive concept, the invention further provides an apparatus for determining leakage volume of fluid in a pipeline. FIG. 9 shows a block diagram of an apparatus according to an embodiment of the invention. As shown in FIG. 9, the apparatus 900 according to the embodiment comprises: a signal-obtaining unit 90, configured to obtain the negative pressure wave signals detected by at least two pressure sensors arranged on the pipelines; a pressure-determining unit 92, configured to determine the pressure signal at the leakage location based on the negative pressure wave signals; a rate-determining unit 94, configured to determine the leakage rate during a leakage period based on the pressure signal at the leakage location according to a leakage model; and a volume-determining unit 96, configured to determine the leakage volume of the fluid in the pipeline based on the leakage rate and leakage period.

In particular, to determine the leakage information, the signal-obtaining unit 90 at least needs to obtain the negative pressure wave signals from two pressure sensors. In one embodiment, the two pressure sensors are located at the upstream and downstream of the leakage location, respectively. More particularly, the two pressure sensors are the ones closest to the leakage location at the upstream and downstream, respectively. It can be understood, however, that according to the desired calculation accuracy, a person skilled in the art may accordingly choose more sensor signals to improve the calculation accuracy or to verify the calculation results; or alternatively, according to the actual arrangement of sensors, a person skilled in the art may choose two or more sensor signals that are more accessible.

In one embodiment, the signal-obtaining unit 90 is further configured to filter the read negative pressure wave signals, for example, by a low pass filter, such that the high frequency noise is removed, thus obtaining much purer signals.

On the basis that the signal-obtaining unit 90 has obtained the negative pressure wave signals from at least two pressure sensors, the pressure-determining unit 92 determines the pressure signal at the leakage location based on the obtained negative pressure wave signals. More particularly, the pressure-determining unit 92 may comprise the following sub-modules: a location-determining module, configured to determine the leakage location based on the negative pressure wave signals of the at least two pressure sensors; and a pressure-determining module, configured to determine the pressure signal at the leakage location according to the obtained negative pressure wave signals and the determined leakage location.

In one embodiment, the location-determining module obtains the leakage location by calculation based on the time points tA and tB when the sudden pressure decrease occurs in the sensor pressure signals, the negative pressure wave propagation speed V, and the fluid transportation speed v. Based on the leakage location thus determined, the pressure-determining module determines the pressure signal P (t) at the leakage location according to a linear pressure intensity model. It can be understood, however, that the linear pressure intensity model is only exemplary but not limiting. A person skilled in the art may modify the model, or use other models and hypotheses to determine the pressure signal P (t).

On the basis of obtaining the pressure signal P (t) at the leakage position, the rate-determining unit 94 and the volume-determining unit 96 analyze the signal and thereby determine additional leakage information.

In one example, the rate-determining unit 94 determines the fluid leakage rate under the pressure signal P (t) by using a proportional leakage model; then the volume-determining unit 96 determines the fluid leakage volume during a time period. In another example, the rate-determining unit 94 and the volume-determining unit 96 modify the simple proportional leakage model by considering changes of the leakage rate with time and changes of pressure intensity, and use the modified model to estimate the leakage rate and volume.

In one embodiment, in order to analyze more complex pressure signals, the rate-determining unit 94 divides the pressure signal based on time segments, and determines the leakage rate within each time segment. In particular, the rate-determining unit 94 may comprise the following sub-modules: a slope-determining module, configured to obtain the slope information of the pressure signal P (t) at leakage location over time; a time-segment-dividing module, configured to divide the leakage period into a plurality of time segments according to the slope information; and a rate-determining module, configured to determine the leakage rate in each time segment according to the leakage model. In one leakage model, the rate-determining module deems that the leakage rate in a time segment is associated with the pressure intensity ratio, thereby obtaining the leakage rate in each time segment. The above model can be modified by further considering additional variables, for example, by introducing a fluid function f (T, flow_type), so as to obtain more accurate estimation of the leakage rate. In another leakage model, a query table is used to indicate the fluid leakage pattern under various pressures. When estimating the fluid leakage rate, the rate-determining module determines various parameters associated with the leakage rate by referring to the query table. It can be understood, however, that the leakage models described above are only exemplary but not limiting. A person skilled in the art may modify the above leakage models, or use other leakage models and hypotheses to determine the leakage rate within a particular time segment.

On the basis of determining the leakage rate in each time segment, the volume-determining unit 96 may obtain the total leakage volume during a time period by summating the leakage volumes in all time segments.

It can be seen that, in order to determine the desired leakage information, the units mentioned above use various models, respectively. These models may be loaded into the apparatus 900 in advance, or be selected or defined by users. To this end, in one embodiment, the apparatus 900 further comprises a model library-providing unit and a model selection-receiving unit (not shown), wherein the model library-providing unit is configured to provide users with a model library comprising various models via an appropriate interface, and provide options of models; and the model selection-receiving unit is configured to receive the selection of models made by users via the interface. In another example, the apparatus 900 may comprise a model definition-receiving unit (not shown), configured to receive the definition of models made by users. It can be understood that the apparatus 900 may selectively comprise a part or all of the model library-providing unit, the model selection-receiving unit and the model definition-receiving unit as described above.

The implementing principle and mode of the apparatus shown in FIG. 9 will not be detailed as they correspond to those of the method shown in FIG. 1. By using the method and apparatus described above, the leakage information of the transportation pipelines can be obtained to help understand the leakage profile of the pipelines and thus reduce losses.

Figure 10:
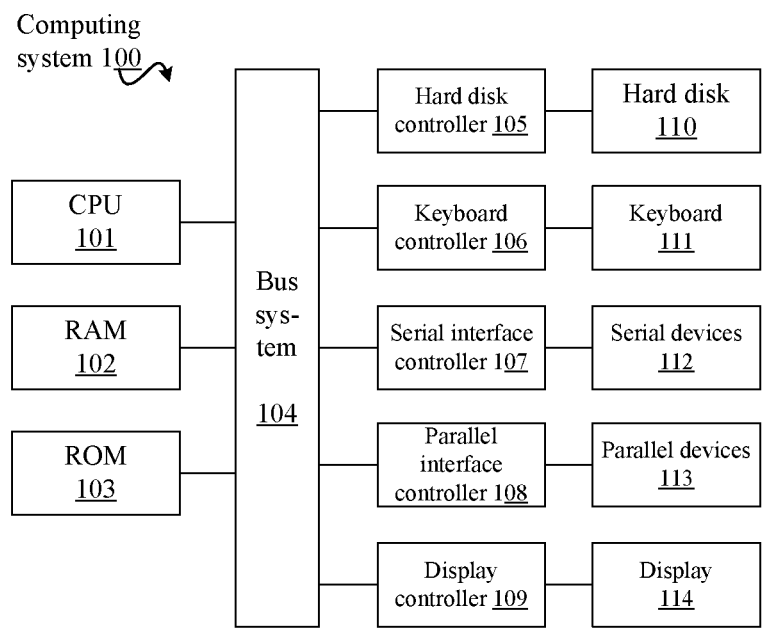
FIG. 10 shows a block diagram of an exemplary computing system 100 suitable to implement an embodiment of the invention.

FIG. 10 shows a block diagram of an illustrative computing system 100 adapted to implement embodiments of the invention. As shown, the computer system 100 may comprise: a CPU (Central Processing Unit) 101, a RAM (Random Access Memory) 102, a ROM (Read-Only Memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113 and a display 114. Among these devices, the system bus 104 couples to the CPU 101, the RAM 102, the ROM 103, the hard disk controller 105, the keyboard controller 106, the serial controller 107, the parallel controller 108 and the display controller 109. The hard disk is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109. It is appreciated that, the structural block diagram shown in FIG. 10 is merely for purpose of illustration, rather than being a limitation to the scope of the invention. In some circumstances, certain devices may be added or removed based on actual condition.

The flowcharts and block diagrams in the accompany drawing illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although respective apparatus and method of the present invention have been described in detail in conjunction with specific embodiments, the present invention is not limited thereto. Under teaching of the specification, various changes, replacements and modifications may be made to the invention by those skilled in the art without departing from the spirit and scope of the invention. It is appreciated that, all such changes, replacements and modifications still fall within the protection scope of the invention. The scope of the invention is defined by the appended claims.

The invention claimed is:

1. A method for determining leakage volume of fluid in a transportation pipeline, the method comprising:
   obtaining negative pressure wave signals detected by at least two pressure sensors arranged on the pipeline;
   determining a pressure signal at a leakage location based on the negative pressure wave signals;
   determining a leakage rate during a leakage period based on the pressure signal at the leakage location according to a leakage model; and
   determining the leakage volume of the fluid in the pipeline based on the leakage rate and the leakage period;
   wherein the at least two pressure sensors are arranged on the pipeline such that, for each whole straight segment of the pipeline, one or more pressure sensors of the at least two pressure sensors are arranged at least at each of a first end and a second end of the respective whole straight segment of the pipeline;
   wherein a first pressure sensor of the at least two pressure sensors is arranged on a value at an inlet at the first end of the respective whole straight of the pipeline and a second pressure sensor of the at least two pressure sensors is arranged in a valve at an outlet of the second end of the respective whole straight segment of the pipeline.

2. The method of claim 1, wherein determining the leakage rate during a leakage period comprises:
   obtaining the slope information of the pressure signal at the leakage location over time;
   dividing the leakage period into a plurality of time segments according to the slope information; and
   determining the leakage rate in each time segment according to the leakage model;
   wherein determining the leakage rate in each time segment comprises selecting from a group comprising at least one of:
   determining the leakage rate according to the ratio of the stable pressure intensity in each time segment to a particular pressure intensity;
   estimating the leakage rate according to the stable pressure intensity in each time segment and a fluid function; and
   determining the leakage rate by referring to a query table;
   wherein determining the leakage volume of the fluid in the pipeline based on the leakage rate comprises:
   summating the leakage volumes in each time segment; and
   obtaining the total leakage volume during the leakage period.

* * * * *